United States Patent [19]

Stark

[11] Patent Number: 5,177,644
[45] Date of Patent: Jan. 5, 1993

[54] TILT MECHANISM

[75] Inventor: Kenneth W. Stark, Adelphi, Md.

[73] Assignee: The United States of America as represented by the Secretary of the Navy, Washington, D.C.

[21] Appl. No.: 679,904

[22] Filed: Apr. 3, 1991

[51] Int. Cl.⁵ .................. G02B 27/00; A47G 1/24
[52] U.S. Cl. ................. 359/896; 359/213; 359/226; 359/874; 359/198; 248/479; 248/487
[58] Field of Search ............... 359/196, 197, 198, 213, 359/872, 873, 874, 875, 876, 214, 221, 223, 224, 225, 226; 248/476, 484, 485, 487, 479

[56] References Cited

U.S. PATENT DOCUMENTS

| | | | |
|---|---|---|---|
| 3,753,150 | 8/1973 | Zar | 331/94.5 |
| 4,056,253 | 11/1977 | Repay et al. | 248/479 |
| 4,060,314 | 11/1977 | Heinz | 248/487 |
| 4,060,315 | 11/1977 | Heinz | 359/876 |
| 4,090,781 | 5/1978 | Godot et al. | 359/226 |
| 4,278,324 | 7/1981 | Zipfel | 248/487 |
| 4,302,709 | 11/1981 | Tichtinsky | 359/214 |
| 4,406,525 | 9/1983 | Itoh et al. | 359/226 |
| 4,655,548 | 4/1987 | Jue | 358/209 |
| 4,680,771 | 7/1987 | Koseki | 372/107 |
| 4,705,365 | 11/1987 | Wakita et al. | 359/224 |
| 4,712,444 | 12/1987 | Lewis | 359/874 |
| 4,750,486 | 6/1988 | Butler et al. | 128/303.1 |
| 4,869,583 | 9/1989 | Tiedje | 359/876 |
| 4,881,814 | 11/1989 | Hoult | 356/346 |
| 4,884,882 | 12/1989 | Schnarch | 359/874 |
| 5,107,365 | 4/1992 | Ota | 359/213 |

*Primary Examiner*—Loha Ben
*Attorney, Agent, or Firm*—Thomas E. McDonnell

[57] ABSTRACT

A tilt mechanism includes a rigid base member, a first tilt plate pivotally mounted on the base member, and a second tilt plate pivotally mounted on the first tilt plate. The first and second tilt plates are pivoted via actuating mechanisms which include stepper motors, harmonic drives, and precision nuts which translate the rotational output of the harmonic drives to pivotal motion of the tilt plates. All of the movable components of the mechanism are mounted to one another via flexural pivots which allow at least limited rotation in one direction but which prevent movement in all other directions.

25 Claims, 2 Drawing Sheets

TILT MECHANISM

BACKGROUND OF THE INVENTION

The U.S. Government has rights in this invention pursuant to a contract with the Office of Naval Research.

The present invention relates to a mount for a mirror and more particularly relates to a mount mechanism for a mirror which provides for adjustment of the mirror through rotational or pivotal movement of a plate on which the mirror is mounted.

One such mount mechanism is disclosed in U.S. Pat. No. 4,750,486, which issued to P. Butler on Jun. 14, 1989. This mount includes a mirror support plate which is pivotally mounted on a base plate via a support rod connected to the center of the support plate. First and second stepper motors, rigidly mounted on the base plate, axially shift links which drive the mirror support plate to pivot about first and second non-parallel axes with respect to the base plate. Each of the links is attached to the mirror support via a mount which comprises a part-spherical surface mounted on the support plate and a complimentary-shaped surface attached to the respective link. A similar ball-and-socket mount is used to connect the mirror support plate to the support rod.

While this mounting mechanism provides a satisfactory mount for use with a relatively light mirror of, e.g., 8 oz., or for use with a mirror in which extremely precise positioning is relatively unimportant, it is ill suited for use with a relatively large mirror which must be accurately positioned, since it is poorly suited to prevent backlash of the mounting plate when the motors are deactivated. This is due in part to the fact that the motors are fixed with respect to the base plate, so that operation of the device would tend to impose torsional forces on the connection between the motors and the base plates which lead to backlash when the motors are deactivated. Although this problem is alleviated somewhat through the provision of the semi-spherical mounts connecting the links to the support plate and the support rod, some backlash is unavoidable.

Some mirror tilt mechanisms attempt to compensate for this backlash problem by continuously operating the motor at reduced power so that the motor itself counteracts the torsional forces imposed thereon. However, this solution is impractical where thermal or power restraints limit the periods for which a motor may be activated.

Another problem inherent in the prior art device is its inability to accurately position a mirror under less than ideal operating conditions, such as conditions in which the assembly is subject to vibrations. This is because the part-spherical mounts connecting the links to the support plate cannot prevent movement of the mirror in unwanted directions with respect to the links and support bar. This in turn may result in unwanted "play" between the mirror support and the base, which not only decreases the precision of the device, but also increases the device's susceptibility to vibrations. An additional disadvantage of this type of mount is that it tends to lose its rigidity when supporting a relatively heavy mirror.

These problems are compounded through the use of a single support plate, which must be mounted on its support via some sort of mount allowing rotation of the mirror about more than one axis. As discussed above, the use of such a mount reduces the accuracy of the device in that it allows rotation of the support plate about more than one axis of rotation whenever one of the stepper motors is actuated. As a result, rotation of the mirror in a first direction may very well result in some rotation of the mirror in a second, unintended direction.

In addition, the worm gear and link mechanism of the prior art device, being incapable of significantly reducing the rotational output of the motors before translating it into linear motion of the links, is poorly suited for use with a device in which extremely accurate positioning of the mirror is necessary, such as in an optical interferometer. In addition, the disclosed actuating mechanism and mounting arrangements are somewhat fragile and complicated and are therefore ill suited for applications in which the mechanism must be operated repeatedly and reliably.

Finally, the prior art mounting mechanism is incapable of compensating for thermal expansion of the components of the mechanism, rendering the device ill-suited for environments where temperatures fluctuate greatly.

SUMMARY OF THE INVENTION

It is therefore an object of the invention to provide a mirror tilt mechanism which is capable of accurately and repeatedly positioning a mirror or other device.

It is another object of the invention to provide a mirror tilt mechanism which is sturdy and which can accurately position a relatively heavy mirror under adverse operating conditions.

It is still another object of the invention to provide a mirror tilt mechanism which can accurately position a mirror or other device in more than one direction independently of one another.

It is yet another object of the invention to provide a mirror tilt mechanism which can effectively compensate for temperature fluctuations which would tend to decrease the accuracy of the device.

In accordance with a first aspect of the invention, a mirror tilt mechanism includes a rigid base member, a first tilt plate, a first tilt plate mounting member pivotally connecting the first tilt plate to the base member, and a first motor having an output. The mechanism additionally includes a first flexural mount via which the first motor is mounted on the base member so as to allow limited pivotal movement of the first motor with respect to the base member about an axis which is substantially orthogonal to the axis of rotation of the output of the motor. A first translation device is connected to the output of the first motor and translates a rotational output of the first motor to a translational output. A first connector connects the translation device to the first tilt plate at a location remote from the first tilt plate mounting member and provides for pivotal movement between the first translation device and the first tilt plate about a first axis.

In accordance with another aspect of the invention, the tilt mechanism may also include a second tilt plate and a second tilt plate mounting member pivotally connecting the second tilt plate to the first tilt plate. The second tilt plate is pivotable with respect to the first tilt plate about an axis which is different than the axis about which the first tilt plate pivots. A second motor may also be provided, along with a second flexural mount via which the second motor is mounted on the first tilt plate. The second flexural mount allows for limited pivotal movement of the second motor with respect to the first tilt plate about an axis of rotation which is substantially orthogonal to an axis of rotation of an output of the second motor. In addition, a second translation device is connected to the output of the second motor and translates a rotational output of the second motor to a translational output. A second connector connects the second translation device to the second tilt plate at a location remote from the second tilt plate mounting member. The second connector provides for limited pivotal movement of between the second translation device and the second tilt plate about a second axis.

Each of the first and second tilt plate mounting members and the first and second connectors preferably comprises a flexural pivot which prevents backlash and which allows limited pivotal movement of the respective tilt plate about one axis but which otherwise prohibits movement of the respective tilt plate.

In order to provide maximum precision, each translation device may comprises a precision nut and lead screw assembly which is connected to the respective tilt plate mounting member, and a harmonic drive device having an input connected to the output of the respective motor and an output which cooperates with the precision nut and lead screw assembly.

In accordance with yet another aspect of the invention, provision is made for the compensation of thermal expansion. To this end, the base member comprises a plate having at least three holes formed therein via which respective fasteners can engage a support structure. At least two of the holes are slotted orthogonally to one another and a third one of the holes is approximately the same size as the respective fastener. In addition, the base member, supports, and tilt plates are all constructed of materials having the same coefficient of thermal expansion to provide for uniform thermal expansion of the device.

Other objects, features and advantages of the present invention will become apparent to those skilled in the art from the following detailed description. It should be understood, however, that the detailed description and specific examples, while indicating preferred embodiments of the present invention, are given by way of illustration and not limitation. Many changes and modifications within the scope of the present invention may be made without departing from the spirit thereof, and the invention includes all such modifications.

DETAILED DESCRIPTION OF THE PREFERRED EMBODIMENTS

Figure 1:
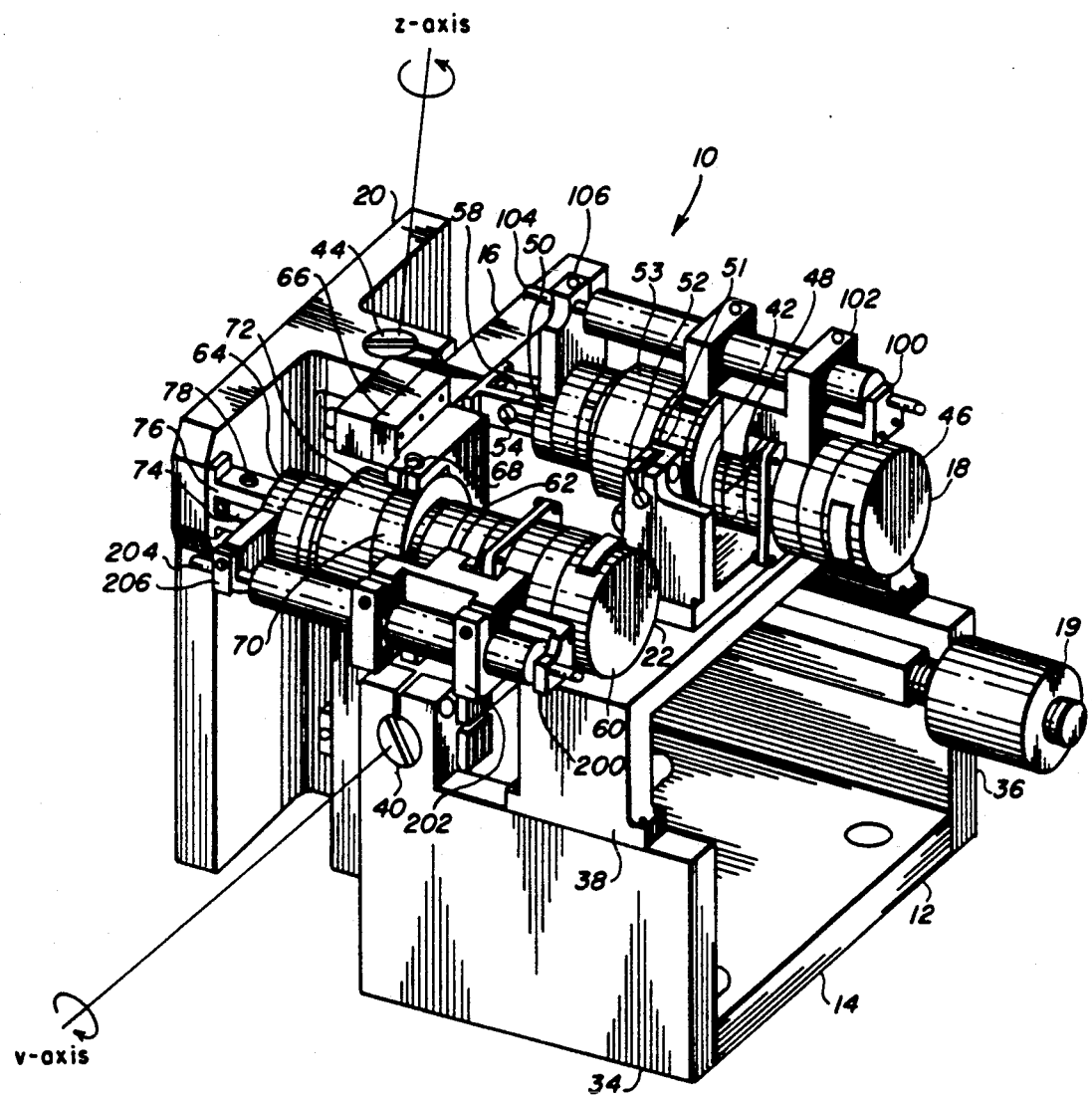
FIG. 1 is a perspective view of a mirror tilt mechanism constructed in accordance with a preferred embodiment of the invention.

Referring to FIG. 1, a mirror tilt mechanism 10 includes a rigid base member 12 which is designed to be mounted on a suitable support via a mounting plate 14. A first tilt plate 16, mounted on the base member 12 via pivots, is driven to rotate or pivot about a first axis of the tilt mechanism 10 by a first actuating mechanism 18 in a manner discussed in more detail below. A second tilt plate 20 and a second actuating mechanism 22 are mounted on first tilt plate 16 The second tilt plate 20 is driven to rotate or pivot about a second axis of mechanism 10 under the actuation of mechanism 22, and both the first and second tilt plates 16 and 20 are driven to rotate together about the first axis under the actuation of mechanism 18. A counterweight 19 is attached to the center of the rear face of the first tilt plate 16 and acts to stabilize movement of the first and second tilt plates and minimize external loads on mechanism 18 in a manner which is known in the art.

Figure 2:
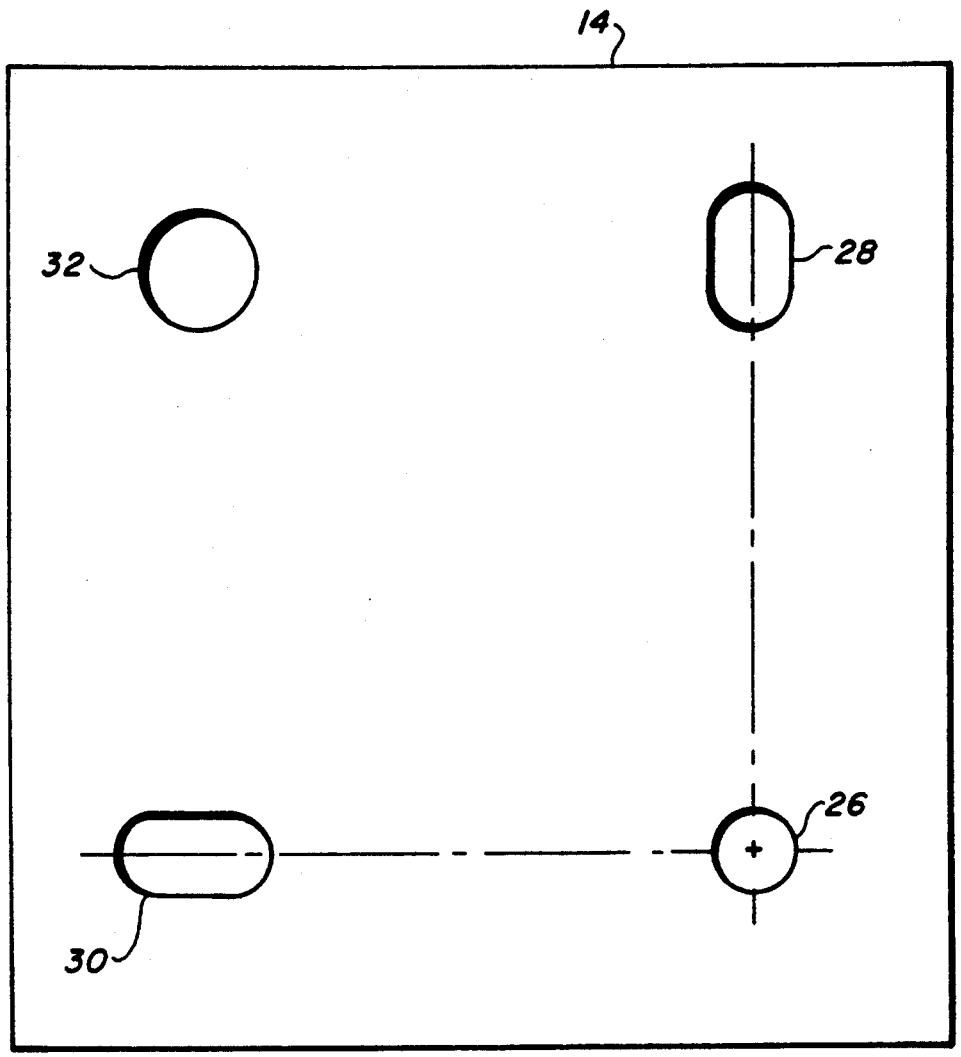
FIG. 2 is a plan view of the base plate of the mechanism illustrated in FIG. 1.

The base plate 14, best seen in FIG. 2, is mounted on a conventional structure such as a movable carriage via fasteners such as bolts or screws extending through holes 26–32. These holes are designed to compensate for differential thermal expansion between the plate and the structure on which it is mounted by allowing the plate to move along the line connecting the centers of holes 26 and 28 and the line connecting the centers of holes 26 and 30 without rotating. To this end, hole 26 is designed to closely match the size of the associated bolt and acts as an anchor for the entire device, thus serving as a reference point for the expansion and contraction of the plate 14 with respect to the structure on which it is mounted. Hole 28 is slotted in a first direction to allow the plate 14 to expand and contract linearly in the first direction relative to hole 26, and hole 30 is slotted in a second direction substantially perpendicular to the first direction and allows the plate 14 to expand and contract linearly in the second direction relative to the hole 26. Hole 32 is sized significantly larger than the associated fastener so as not to interfere with movement of the plate in either direction. While the disclosed relationship is preferred for its simplicity, any mounting arrangement which allows the plate to expand linearly without rotating could be used in place of the disclosed arrangement.

In the preferred embodiment, the base member 12 also includes a pair of walls 34, 36 extending generally vertically from the lateral edges of base plate 14, which walls support a bridge member 38 which bears a support assembly 42 for first actuating mechanism 18. The walls 34, 36 also support the first tilt plate 16 via mounts 40 disposed in each of the walls.

Although the base member need not have the specific shape discussed above, it should be constructed out of a substance exhibiting uniform thermal properties so as to allow for uniform thermal expansion of the entire device. This material should also be sufficiently strong and rigid to support the first tilt plate 16 and the first actuating mechanism 18 under conditions in which the tilt mechanism as a whole is subject to significant accelerations or vibrations. The tilt plates 16 and 20 and their supports and the supports for the mechanisms 18 and 22 should also be constructed of this same material for these same reasons. Although aluminum is used in the preferred embodiment for its strength and durability, any material exhibiting the characteristics discussed above could be used for the base member, the support members, and the tilt plates.

As discussed above, the first tilt plate 16 is connected to the lateral walls 34, 36 proximate the vertical center of the tilt plate so as to rotate about the first axis of the mechanism 10. The mounts 40 providing the actual connection of these members preferably comprise flexural pivots which allow at least limited pivotal or rotational movement of the first tilt plate 16 with respect to the base member 12 but which prohibit all other movement. Although any pin arrangement could provide the required rotation, the preferred mount comprises a socalled flex-mount that deforms a sufficient amount under torsional forces to allow limited rotation between the two elements, while preventing relative movement therebetween in all other directions.

One such flex-mount, which is particularly well suited for the present invention, has internal springs which allow the mount to be pre-loaded during assembly by twisting or rotating axial halves of the mount through a limited angle with respect to one another before connecting the second element to the mount, thereby further reducing backlash within the system. This flex-mount is constructed in the shape of a hollow cylinder and is formed by two cylindrical elements joined to one another by spring elements disposed within the mount. The generally cylindrical shell of each of these elements is wider on one side of the cylinder than on the other side, with the narrower side extending axially only to the axial center of the mount. The wider side, on the other hand, includes a narrowed portion which extends in a cantilevered fashion to the far end of the mount. The spring elements are mounted perpendicular to one another in the center of the mount.

The cantilevered nature of the wide portion of the respective halves of the mount, coupled with the spring elements located within the mount, allow the respective axial halves of the mount to rotate a limited degree relative to one another against the forces of the springs while simultaneously inhibiting backlash.

Flex-mounts of the type described above are known in the art and are commercially available. For example, a suitable mount is manufactured and sold by Lucas Aerospace Transmission Corporation under the trade name Lucas Free-Flex ®.

If desired, a spring or other suitable biasing device could be placed between the first and second tilt plates 16 and 20 to provide further resistance to backlash.

The second tilt plate 20 is similarly mounted on the first tilt plate 16 via flexural pivots or mounts 44 connecting upper and lower central portions of the first and second tilt plates. These mounts are identical in construction and operation to the mounts 40 connecting the first tilt plate 16 to the base member 12.

Each of the first and second actuating mechanisms 18 and 22 is designed to translate an output of a motor into a pivotal or rotational output of the associated tilt plate. In the disclosed embodiment, the actuating mechanism 18 includes an electric motor 46, a gear reducer 48 which reduces the rotational output of the motor to one of smaller magnitude, and a device 50 which translates the rotational output of the gear reducer 48 to a translational motion. The actuating mechanism is mounted on support 42 via a collar 53 cooperating with a mount 51 connected to the mechanism 18 and flex-mounts 52 which connect the mount 51 to the support 42. These mounts, which are identical in construction to mounts 40 and 44, allow limited rotational movement of the actuating mechanism 18 with respect to support 42 under forces imposed on the tilt plate 16 by the mechanism 18 when the mechanism is actuated. Preferably, the axis about which the mechanism pivots is substantially orthogonal to the axis of rotation of the output of the motor. The mounts increase the precision of the device by preventing binding between the mechanism 18 and the support 42, thereby insuring a uniform output of the actuating mechanism for a given input. The mounts 52 also prevent backlash by absorbing forces imposed thereon, thereby further increasing the precision of the tilt mechanism and obviating the need to provide continuous power to the motor. The device 50 is connected to an upper portion of the first tilt plate 16 via a flex-mount or connector 54 which is identical in construction to mounts 52. In the disclosed embodiment, the connector 54 connects a male joint 56 associated with the device 50 to a female joint 58 connected to the tilt plate 16

In the preferred embodiment, a stepper motor is used as the motor 46 because it is capable of accurately providing a discrete output for a given input and because it is capable of operating in a vacuum. The gear reducer 48 preferably comprises a conventional harmonic drive device which provides a precise gear reduction of, e.g, 100:1. Harmonic drive devices also incorporate a natural gear pre-load which significantly reduces backlash within the drive. Suitable harmonic drives are known in the art and are commercially available. For example, one such device is manufactured and sold by Harmonic Drive, a division of Quincy Technologies Inc.

The device 50 preferably comprises a lead screw and nut assembly which cooperates with an output of the harmonic drive device and which translates the rotational motion of the harmonic drive to translational motion. This assembly preferably comprises a precision nut and lead screw assembly presenting a relatively fine pitch which enables the nut and screw assembly to reduce further the rotational output of the motor and harmonic drive while simultaneously translating the rotational input from the harmonic drive to a translational output. This translation is imparted to the edge of first tilt plate 16 via connector 54.

The second actuating mechanism 22 is identical in construction and operation to the first actuating mechanism 18, and includes a stepper motor 60, a harmonic drive device 62, and an assembly 64 comprising a precision nut and lead screw assembly connected to the output of harmonic drive device 62. The actuating mechanism is mounted on the first tilt plate 16 via a support 66, flex-mounts 68 which are identical in construction and operation to flex-mounts 52, a mount 70, and a collar 72. A female joint 74 is fixed proximate a lateral edge of the second tilt plate 20, and a male joint 76 is fixed to precision nut and lead screw assembly 64 and is connected to the female joint 74 via a flex-mount or connector 78 which is identical in construction and operation to flex-mount or connector 54.

If desired, the operation of each of the actuating mechanisms can be monitored via conventional linear variable differential transformers (LVDTs) 100, 200 which monitor the actual translation of one portion of each of the actuating mechanisms relative to the remainder of the mechanism. In the preferred embodiment, each LVDT includes a support 102, 202 which is mounted on a stationary portion of the respective actuating mechanism and which slideably supports a rod 104, 204. One end of each rod 104, 204 is fixedly connected to a bar 106, 206 which moves axially with the respective precision nut.

By directly or indirectly monitoring the translation of the output of the actuating mechanisms using LVDTs, a control signal can be generated which deactivates the respective motor if the nut of the precision nut and lead screw assembly is positioned too near either end of the threaded shaft. These LVDT's can thus be used to prevent damage to the tilt mechanism caused by excessive rotation of the precision nuts in either direction.

In operation, a mirror, which is mounted on second tilt plate 20, is rotated about one of two, preferably substantially orthogonal, axes via actuation of one of the actuating mechanisms 18, 22. Assuming first that the operator wishes to rotate the mirror about the y-axis comprising the first axis of the tilt mechanism 10, the stepper motor 46 is rotated through a predetermined angle which drives the harmonic drive 48 to rotate through a smaller angle which in turn results in a predetermined axial translation of precision nut 50. This axial translation causes the tilt plates 16 and 20, and thus the mirror, to rotate or pivot about pivot mounts 40 by a predetermined degree. Rotation of the mirror about the z-axis comprising the second axis of the tilt mechanism is obtained in a similar manner by actuating motor 60 to translate the lateral edge of tilt plate 20 axially with respect to the actuating mechanism 22, thereby driving the tilt plate 20 to pivot about flexural pivot mounts 44.

The actual position of the mirror can be monitored via any suitable method, such as the well known laser metrology method which utilizes reflected laser beams from the mirror to determine its precise position. The detected position can then be used as a feed-back control for the stepper motors in a manner which is known in the art.

Through the provision of the stepper motors, the harmonic drive devices, the precision nuts, and the described mounting arrangements, the resulting tilt mechanism is capable of achieving a degree of precision which cannot be obtained by existing devices. In fact, the described arrangement provides for a rotation of each tilt plate through an angle of only 0.1 arc second for each 1.8° rotation of the motor. Of course, if this degree of precision is not needed in a particular application, the described actuating mechanisms can be replaced with less precise arrangements. For example, the stepper motor could be replaced with a less precise electric motor or with any other suitable motor, and the harmonic drive and precision nut and lead screw assembly could be replaced by any suitable gear reduction and translation devices. Moreover, the first and second tilt plates could be replaced by a single tilt plate if rotation about only one axis is needed for a particular application. However, as discussed above, the disclosed combination is particularly advantageous not only because it is very precise but also because it is very sturdy, thereby increasing not only the precision but also the reliability and durability of the tilt mechanism.

The reliability, precision, and durability of the tilt mechanism is further enhanced through the use of sturdy mounting arrangements and spring-loaded flex-mounts at the mounting points of all elements which are movable relative to one another. In addition, the provision of separate tilt plates for the y and z axes increases the accuracy of the device by allowing adjustment about the respective axes completely independently of one another. Moreover, the use of two tilt plates enables the plates to be mounted via the disclosed flex-mounts, which are much sturdier and more precise than ball-and-socket mounts or other mounts allowing rotation about more than one axis and which therefore provide for precise operation of the mechanism. The mechanism is therefore capable of accurately positioning a mirror weighing several pounds or more, even under adverse operating conditions.

Moreover, since the disclosed actuating mechanisms are capable of operating effectively in a vacuum, the device can be used for space-based operations, such as in a space-based optical interferometer.

Finally, the use of a tilt mechanism having all major parts constructed of the same material, when combined with a base plate which is designed to allow for differential thermal expansion between the base plate and the member onto which it is mounted, minimizes the effects of temperature changes on the mechanism.

While specific embodiments of the invention have been described and illustrated, it will be clear that variations in the details of the embodiments specifically illustrated and described may be made without departing from the true spirit and scope of the invention as defined in the appended claims.

What is claimed is:

1. A tilt mechanism comprising:
   (A) a rigid base member;
   (B) a first tilt plate;
   (C) a first tilt plate mounting member pivotally connecting said first tilt plate to said base member;
   (D) a first motor having, an output;
   (E) a first flexural mount via which said first motor is mounted on said base member, said first flexural mount allowing limited pivotal movement of said first motor relative to said base member about an axis which is substantially orthogonal to an axis of rotation of said output of said first motor;
   (F) a first translation device which is connected to said output of said first motor and which translates a rotational output of said first motor to a translational output; and
   (G) a first connector connecting said translation device to said first tilt plate at a location remote from said first tilt plate mounting member, said first connector allowing pivotal movement between said first translation device and said first tilt plate.

2. The tilt mechanism of claim 1, wherein said first tilt plate mounting member comprises a flexural pivot which prevents backlash and which provides for limited pivoting of said first tilt plate with respect to said base member about a first axis of rotation but which prohibits movement therebetween in all other directions.

3. The tilt mechanism of claim 2, wherein said first connector comprises a flexural pivot which prevents backlash and which provides for limited pivoting of said first tilt plate with respect to said translation device about a second axis of rotation which is substantially perpendicular to said first axis of rotation, said first connector otherwise prohibiting movement of said first tilt plate relative to said translation device.

4. The tilt mechanism of claim 1, wherein said translation device comprises
   a precision nut and lead screw assembly which is connected to said first connector, and
   a harmonic drive device having an input connected to said output of said first motor and an output which cooperates with said precision nut and lead screw assembly.

5. The tilt mechanism of claim 1, further comprising:
   (H) a second tilt plate;
   (I) a second tilt plate mounting member pivotally connecting said second tilt plate to said first tilt plate, said second tilt plate being pivotable with respect to said first tilt plate in a direction which is different from the direction in which said first tilt plate pivots with respect to said base member;
   (J) a second motor having an output;
   (K) a second flexural mount via which said second motor is mounted on said first tilt plate, said second flexural mount allowing limited pivotal movement of said second motor relative to said second tilt plate about an axis which is substantially orthogonal to an axis of rotation of said output of said second motor;

(L) a second translation device which is connected to said output of said second motor and which translates a rotational output of said second motor to a translational output; and (M) a second connector connecting said second translation device to said second tilt plate at a location remote from said second tilt plate mounting member, said second connector allowing pivotal movement between said second translation device and said second tilt plate.

6. The tilt mechanism of claim 5, wherein each of said first and second tilt plate mounting members and said first and second connectors comprises a flexural pivot which prevents backlash and which provides for pivotal movement of the respective tilt plate about one axis but which otherwise prohibits movement of the respective tilt plate.

7. The tilt mechanism of claim 6, wherein each of said first and second tilt plate mounting members are preloaded by rotating said first and second tilt plate mounting members through a limited angle of rotation prior to assembly.

8. The tilt mechanism of claim 5, wherein said first translation device comprises
   a first precision nut and lead screw assembly which is connected to said first connector, and
   a harmonic drive device having an input connected to said output of said first motor and an output which cooperates with said first precision nut and lead screw assembly.

9. The tilt mechanism of claim 8, wherein said second translation device comprises
   a second precision nut and lead screw assembly which is connected to said second connector, and
   a harmonic drive device having an input connected to said output of said second motor and an output which cooperates with said second precision nut and lead screw assembly.

10. The tilt mechanism of claim 5, wherein said first and second motors each comprise an electric stepper motor.

11. The tilt mechanism of claim 5, wherein the axis about which said first tilt plate pivots relative to said base member is substantially orthogonal to the axis about which said second tilt plate pivots relative to said first tilt plate.

12. The tilt mechanism of claim 5, further comprising first and second linear variable displacement transformers which are connected to said first and second translation devices, respectively, and which monitor motion of said first and second translation devices.

13. The tilt mechanism of claim 1, wherein said first motor comprises an electric stepper motor.

14. The tilt mechanism of claim 1, wherein said base member comprises a plate having at least three holes formed therein via which respective fasteners can engage a support structure, and wherein at least two of said holes are slotted in directions extending substantially orthogonally from one another and a third one of said holes is approximately the same size as the respective fastener.

15. The tilt mechanism of claim 1, wherein a rotation of said first motor through 1.8° pivots said first tilt plate through about 0.1 arc second.

16. The tilt mechanism of claim 1, wherein said first tilt plate and said base member are constructed of materials having the same coefficient of expansion.

17. A tilt mechanism comprising:
(A) a rigid base member;
(B) a first tilt plate;
(C) first tilt plate mounting means for pivotally connecting said first tilt plate to said base member;
(D) a first motor;
(E) first motor mounting means for connecting said first motor to said base member, said first motor mounting means allowing pivotal movement of said first motor relative to said base member about an axis which is substantially orthogonal to an axis of rotation of an output of said first motor;
(F) first translation means for translating a rotational output of said first motor to a translational output; and
(G) first connector means for connecting said first translation means to said first tilt plate at a location remote from said first tilt plate mounting means, said first connector means allowing pivotal movement between said first translation means and said first tilt plate.

18. The tilt mechanism of claim 17, further comprising:
(H) a second tilt plate;
(I) second tilt plate mounting means for connecting said second tilt plate to said first tilt plate, said second tilt plate being pivotable with respect to said first tilt plate in a direction which is different from the direction in which said first tilt plate pivots with respect to said base member;
(J) a second motor;
(K) second motor mounting means for connecting said second motor to said first tilt plate, said second motor mounting means allowing pivotal movement of said second motor relative to said first tilt plate about an axis which is substantially orthogonal to an axis of rotation of an output of said second motor;
(L) second translation means for translating a rotational output of said second motor to a translational output; and
(M) second connector means for connecting said second tilt plate to said second translation means at a location remote from said second tilt plate mounting means, said second connector means allowing pivotal movement between said second translation means and said second tilt plate.

19. The tilt mechanism of claim 18, wherein each of said first and second tilt plate mounting means and said first and second connector means comprises a flexural pivot which prevents backlash and which provides for pivotal movement of the respective tilt plate about one axis but which otherwise prohibits movement of the respective tilt plate.

20. The tilt mechanism of claim 18, wherein each of said first and second translation means comprises
   a precision nut and lead screw assembly which is connected to the respective connector means, and
   a harmonic drive device having an input connected to the output of the respective motor and an output which cooperates with said precision nut and lead screw assembly.

21. The tilt mechanism of claim 18, wherein a rotation of each of said first and second motors through 1.8° pivots the associated tilt plate through about 0.1 arc second.

22. The tilt mechanism of claim 18, wherein the axis about which said first tilt plate pivots relative to said base member is substantially orthogonal to the axis about which said second tilt plate pivots relative to said first tilt plate.

23. The tilt mechanism of claim 18, further comprising first and second linear variable differential transformers which are mounted on said first and second translation means, respectively, and which monitor motion of said first and second translation means.

24. A tilt mechanism comprising:
(A) a rigid base member;
(B) a first tilt plate which is connected to said rigid base member and which is pivotable about a first axis relative to said base member;
(C) a second tilt plate which is connected to said first tilt plate and which is pivotable about a second axis relative to said first tilt plate; and
(D) actuating mechanisms connected to each of said first and second tilt plates, each of said actuating mechanisms comprising
a motor having an output,
a harmonic drive device which is connected to said output of said motor, and
a precision nut and lead screw assembly which connects said harmonic drive to the respective tilt plate and which translates a rotational output of said harmonic drive to pivotal movement of the respective tilt plate.

25. The tilt mechanism of claim 24, wherein said first and second axes are substantially orthogonal to one another.

* * * * *